(12) United States Patent
Kabaria et al.

(10) Patent No.: US 11,867,248 B2
(45) Date of Patent: Jan. 9, 2024

(54) LATTICE TRANSITIONING STRUCTURES IN ADDITIVELY MANUFACTURED PRODUCTS

(71) Applicant: Carbon, Inc., Redwood City, CA (US)

(72) Inventors: Hardik Kabaria, San Francisco, CA (US); Aidan Kurtz, Palomar Park, CA (US)

(73) Assignee: Carbon, Inc., Redwood City, CA (US)

( * ) Notice: Subject to any disclaimer, the term of this patent is extended or adjusted under 35 U.S.C. 154(b) by 484 days.

(21) Appl. No.: 17/269,129

(22) PCT Filed: Oct. 17, 2019

(86) PCT No.: PCT/US2019/056706
§ 371 (c)(1),
(2) Date: Feb. 17, 2021

(87) PCT Pub. No.: WO2020/086372
PCT Pub. Date: Apr. 30, 2020

(65) Prior Publication Data
US 2021/0246959 A1 Aug. 12, 2021

Related U.S. Application Data

(60) Provisional application No. 62/748,624, filed on Oct. 22, 2018.

(51) Int. Cl.
*B33Y 10/00* (2015.01)
*B33Y 50/00* (2015.01)
(Continued)

(52) U.S. Cl.
CPC ............ *F16F 1/3737* (2013.01); *B29C 64/10* (2017.08); *B29C 64/386* (2017.08); *B33Y 10/00* (2014.12);
(Continued)

(58) Field of Classification Search
None
See application file for complete search history.

(56) References Cited

U.S. PATENT DOCUMENTS 5,236,637 A 8/1993 Hull
5,391,072 A 2/1995 Lawton et al.
(Continued)

FOREIGN PATENT DOCUMENTS

CN 104890238 A 9/2015
WO 2014160389 A1 10/2014
(Continued)

OTHER PUBLICATIONS

First Chinese Office Action and Search Report corresponding to CN 201980069537.4; dated Mar. 3, 2022 (26 pages, including English translation).

(Continued)

*Primary Examiner* — Elizabeth Collister
(74) *Attorney, Agent, or Firm* — Myers Bigel, P.A.

(57) ABSTRACT

An additively manufactured lattice structure includes (a) a first three-dimensional lattice including a repeating interconnected array of a first lattice unit cell, (b) a second three-dimensional lattice including a repeating interconnected array of a second lattice unit cell, wherein said second lattice unit cell is different from said first lattice unit cell, and (c) a first transition segment interconnecting said first three-dimensional lattice and said second three-dimensional lattice. The first transition segment includes (i) a first three-dimensional transitional lattice including a repeating array of said first lattice unit cell and (ii) interleaved with and interconnected to said first three-dimensional transitional lattice, a second three-dimensional transitional lattice including a repeating array of said second lattice unit cell.

18 Claims, 6 Drawing Sheets

(51) Int. Cl.
  *B33Y 80/00* (2015.01)
  *B29C 64/10* (2017.01)
  *F16F 1/373* (2006.01)
  *B29C 64/386* (2017.01)
  *F16H 51/00* (2006.01)

(52) U.S. Cl.
  CPC .............. *B33Y 50/00* (2014.12); *B33Y 80/00* (2014.12); *F16H 51/00* (2013.01); *F16F 2226/04* (2013.01); *F16F 2234/06* (2013.01)

(56) References Cited

U.S. PATENT DOCUMENTS

| | | | |
|---|---|---|---|
| 5,505,035 | A | 4/1996 | Lalvani |
| 5,529,473 | A | 6/1996 | Lawton et al. |
| 7,438,846 | B2 | 10/2008 | John |
| 7,892,474 | B2 | 2/2011 | Shkolnik et al. |
| 8,110,135 | B2 | 2/2012 | El-Siblani |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,453,142 | B2 | 9/2016 | Rolland et al. |
| 9,598,606 | B2 | 3/2017 | Rolland et al. |
| 9,676,963 | B2 | 6/2017 | Rolland et al. |
| 10,259,041 | B2 | 4/2019 | Gessler et al. |
| 2013/0292862 | A1 | 11/2013 | Joyce |
| 2013/0295212 | A1 | 11/2013 | Chen et al. |
| 2015/0331402 | A1 | 11/2015 | Lin et al. |
| 2015/0360419 | A1 | 12/2015 | Willis et al. |
| 2016/0027425 | A1* | 1/2016 | Cook .................. F28D 7/0058 428/221 |
| 2016/0288376 | A1 | 10/2016 | Sun et al. |
| 2017/0129167 | A1 | 5/2017 | Castanon |
| 2017/0129169 | A1 | 5/2017 | Batchelder et al. |
| 2018/0126630 | A1 | 5/2018 | Panzer et al. |
| 2018/0229443 | A1* | 8/2018 | Pham .................. B29C 70/026 |
| 2018/0243976 | A1 | 8/2018 | Feller |
| 2018/0251163 | A1* | 9/2018 | Martin ................ B33Y 80/00 |
| 2018/0264718 | A1 | 9/2018 | Mccluskey |
| 2018/0271213 | A1* | 9/2018 | Perrault ............... A43B 13/141 |
| 2018/0290374 | A1 | 10/2018 | Willis et al. |
| 2019/0152139 | A1* | 5/2019 | Ulichney .............. B33Y 50/02 |

FOREIGN PATENT DOCUMENTS

| | | |
|---|---|---|
| WO | 2015164234 A1 | 10/2015 |
| WO | 2016133759 A1 | 8/2016 |
| WO | 2016145182 A1 | 9/2016 |
| WO | 2018022035 A1 | 2/2018 |
| WO | 2019089252 A1 | 5/2019 |

OTHER PUBLICATIONS

International Search Report and Written Opinion corresponding to PCT/US2019/056706; dated Feb. 7, 2020 (12 pages).
Bikas, H., et al., "Additive manufacturing methods and modelling approaches: a critical review", Int J Adv Manuf Technol, 83, 2016, 389-405.
Januszewicz, Rima, et al., "Layerless fabrication with continuous liquid interface production", PNAS, 113, 2016, 11703-11708.
Poelma, Justin, et al., "Rethinking digital manufacturing with polymers", Science, 358(6369), 2017, 1384-1385.
Tumbleston, John R., et al., "Continuous liquid interface production of 3D Objects", Science, 347(6228), 2015, 1349-1352.

* cited by examiner

LATTICE TRANSITIONING STRUCTURES IN ADDITIVELY MANUFACTURED PRODUCTS

CROSS REFERENCE TO RELATED APPLICATIONS

This application is a 35 U.S.C. § 371 national phase application of International Application Serial No. PCT/US2019/056706, filed Oct. 17, 2019, which claims priority to U.S. Provisional Application Ser. No. 62/748,624, filed Oct. 22, 2018, the entire contents of which are hereby incorporated by reference.

FIELD OF THE INVENTION

The present invention concerns lattice transitioning structures useful in bumpers, pads, cushions, shock absorbers, and other lattice objects produced by additive manufacturing.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into a pool of resin.

The recent introduction of a more rapid stereolithography technique sometimes referred to as continuous liquid interface production (CLIP) has expanded the usefulness of stereolithography from prototyping to manufacturing. See J. Tumbleston, D, Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017).

There is great interest in developing lattice objects for additively manufactured products. However, the problem of how to interconnect multiple different lattice types in a smooth manner in a single object has not heretofore been addressed.

SUMMARY OF THE INVENTION

Various embodiments described herein provide lattice structures including a transition segment between two types of lattices, and method for automatically generating said transition segment.

According to some embodiments described herein, an additively manufactured lattice structure includes (a) a first three-dimensional lattice including a repeating interconnected array of a first lattice unit cell, (b) a second three-dimensional lattice including a repeating interconnected array of a second lattice unit cell, wherein said second lattice unit cell is different from said first lattice unit cell, and (c) a first transition segment interconnecting said first three-dimensional lattice and second three-dimensional lattice. The first transition segment includes (i) a first three-dimensional transitional lattice including a repeating array of said first lattice unit cell and (ii) interleaved with and interconnected to said first three-dimensional transitional lattice, a second three-dimensional transitional lattice including a repeating array of said second lattice unit cell.

In some embodiments, the lattice structure father includes (d) a third three-dimensional lattice comprising of a repeating interconnected array of a third lattice unit cell, wherein said third lattice unit cell is different from said second, and optionally said first, lattice unit cell and (e) a second transition segment interconnecting said second three-dimensional lattice and said third three-dimensional lattice. The second transition segment includes (iii) a third three-dimensional transitional lattice comprising a repeating array of said second lattice unit cell, and (iv) interleaved with and interconnected to said third three-dimensional transitional lattice, a fourth three-dimensional transitional lattice comprising a repeating array of said third lattice unit cell.

In some embodiments, said first transition segment has a first portion connected to said first three-dimensional lattice and a second portion connected to said second three-dimensional lattice, said first lattice unit cells of said first three-dimensional transitional lattice progressively contract in size from said first portion to said second portion, said second lattice unit cells of said second three-dimensional transitional lattice progressively expand in size from said first portion to said second portion, said second transition segment when present has a third portion connected to said second three-dimensional lattice and a fourth portion connected to said third three-dimensional lattice when present, said second lattice unit cells of said third three-dimensional transitional lattice progressively contract in size from said third portion to said fourth portion, and said third lattice unit cells of said fourth three-dimensional transitional lattice progressively expand in size from said first portion to said second portion.

In some embodiments, the lattice structure is produced by a process of additive manufacturing (e.g., selective laser sintering (SLS), fused deposition modeling (FDM), stereolithography (SLA), three-dimensional printing (3DP), or multijet modeling (MJM).

In some embodiments, said first three-dimensional lattice and second three-dimensional lattice are formed form the same material (e.g., a polymer, metal, ceramic, or composite thereof).

In some embodiments, said lattice structure is rigid, flexible, or elastic.

In some embodiments, said first and second lattice arrays are independently selected tetrahedral mesh (e.g., an A15, C15, or alpha space packing, etc.) or hexahedral mesh lattices.

According to some embodiments described herein, a brace, arm, link, shock absorber, cushion, or pad includes a lattice structure of the embodiments described herein.

According to some embodiments described herein, a wearable protective device includes a brace, arm, link, shock absorber, cushion, or pad of the embodiments described herein (e.g., a shin guard, knee pad, elbow pad, sports brassiere, bicycling shorts, backpack strap, backpack back, neck brace, chest protector, protective vest, protective jackets, slacks, suits, overalls, jumpsuit, and protective slacks, etc.).

According to some embodiments described herein, a bed or seat includes a brace, arm, link, shock absorber, cushion, or pad of the embodiments described herein.

According to some embodiments described herein, automotive or aerospace panel, bumper, or component includes a brace, arm, link, shock absorber, cushion, or pad of the embodiments described herein.

According to some embodiments described herein, a method of making an object of the embodiments described herein includes (a) providing a digital model of said object; and then (b) producing said object from said digital model by an additive manufacturing process.

According to some embodiments described herein, a method for generating a lattice structure includes generating a first three-dimensional lattice comprising a first repeating interconnected array of a first lattice unit cell, generating a second three-dimensional lattice comprising a first repeating interconnected array of a second lattice unit cell, wherein the second lattice unit cell is different from the first lattice unit cell, and generating a transition segment interconnecting the first three-dimensional lattice and the second three-dimensional lattice, wherein the transition segment comprises a first three-dimensional transitional lattice comprising a second repeating array of the first lattice unit cell, and, interleaved with and interconnected to the first three-dimensional transitional lattice, a second three-dimensional transitional lattice comprising a second repeating array of the second lattice unit cell.

In some embodiments, the transition segment has a first portion connected to the first three-dimensional lattice and a second portion connected to the second three-dimensional lattice, the first lattice unit cells of the first three-dimensional transitional lattice progressively contract in size from the first portion to the second portion, and the second lattice unit cells of the second three-dimensional transitional lattice progressively expand in size from the first portion to the second portion.

In some embodiments, generating the transition segment interconnecting the first three-dimensional lattice and the second three-dimensional lattice comprises placing ones of the second repeating array of the second lattice unit cell adjacent a vertex and/or edge of ones of the second repeating array of the first lattice unit cell.

In some embodiments, the transition segment further comprises a third three-dimensional transitional lattice comprising a repeating array of a third lattice unit cell, different from the first lattice unit cell and the second lattice unit cell.

According to some embodiments described herein, a computer program product includes a tangible non-transitory computer readable storage medium comprising computer readable program code embodied in the computer readable storage medium that when executed by at least one processor causes the at least one processor to perform operations including generating a first three-dimensional lattice comprising a first repeating interconnected array of a first lattice unit cell, generating a second three-dimensional lattice comprising a first repeating interconnected array of a second lattice unit cell, wherein the second lattice unit cell is different from the first lattice unit cell, and generating a transition segment interconnecting the first three-dimensional lattice and the second three-dimensional lattice, wherein the transition segment comprises a first three-dimensional transitional lattice comprising a second repeating array of the first lattice unit cell, and, interleaved with and interconnected to the first three-dimensional transitional lattice, a second three-dimensional transitional lattice comprising a second repeating array of the second lattice unit cell.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
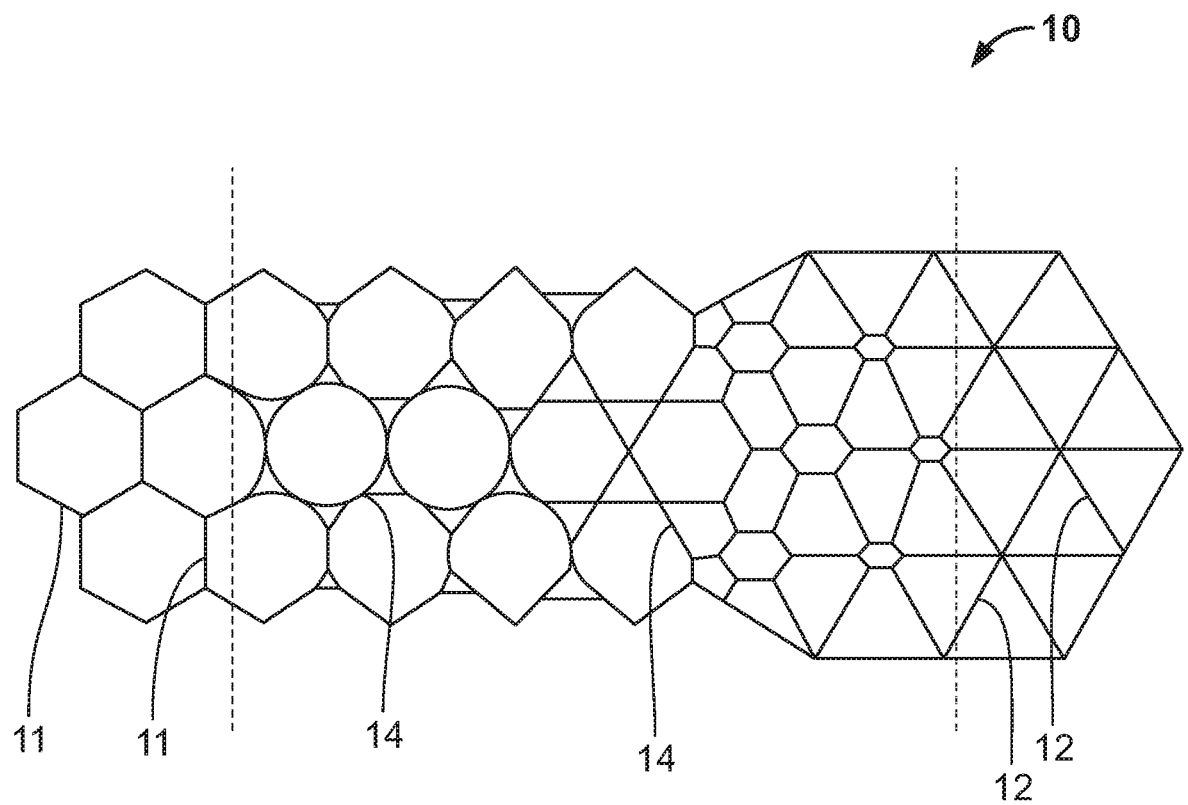
FIG. 1 schematically illustrates one embodiment of a lattice structure of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

Additive Manufacturing Methods, Apparatus and Resins.

Techniques for additive manufacturing are known. Suitable techniques include, but are not limited to, techniques such as selective laser sintering (SLS), fused deposition modeling (FDM), stereolithography (SLA), material jetting including three-dimensional printing (3DP) and multijet modeling (MJM)(MJM including Multi-Jet Fusion such as available from Hewlett Packard), and others. See, e.g., H. Bikas et al., *Additive manufacturing methods and modelling approaches: a critical review*, Int. J. Adv. Manuf. Technol. 83, 389-405 (2016).

Resins for additive manufacturing of polymer articles are known and described in, for example, DeSimone et al., U.S. Pat. Nos. 9,211,678; 9,205,601; and 9,216,546. Dual cure resins for additive manufacturing are known and described in, for example, Rolland et al., U.S. Pat. Nos. 9,676,963; 9,598,606; and 9,453,142. Non-limiting examples of dual cure resins include, but are not limited to, resins for producing objects comprised of polymers such as polyurethane, polyurea, and copolymers thereof; objects comprised of epoxy; objects comprised of cyanate ester; objects comprised of silicone, etc.

Stereolithography, including bottom-up and top-down techniques, are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out particular embodiments of CLIP include, but are not limited to: B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018); Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419 (Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017).

After the object is formed, it is typically cleaned, and in some embodiments then further cured, preferably by baking (although further curing may in some embodiments be concurrent with the first cure, or may be by different mechanisms such as contacting to water, as described in U.S. Pat. No. 9,453,142 to Rolland et al.).

The embodiments described herein provide a method, and a resulting lattice structure therefrom, that provides for the transition from a first lattice type to a second lattice type.

FIG. 1 schematically illustrates one embodiment of a lattice structure 10 of the present invention. As illustrated in FIG. 1, the lattice structure 10 may be composed of a first lattice 11 of a first type and a second lattice 12 of a second type. The first lattice 11 may include a repeating interconnected array of a first lattice unit cell. The second lattice 12 may include a repeating interconnected array of a second lattice unit cell. In some embodiments, the first lattice unit cell of the first lattice 11 and the second lattice unit cell of the second lattice 12 may be different from one another. Though illustrated in two dimensions in FIG. 1, it will be understood that the first lattice 11 and the second lattice 12 may be formed in three-dimensions. In some embodiments, the first lattice 11 and the second lattice 12 may be defined by a mesh composed of a plurality of polyhedrons. In some embodiments, the first lattice 11 and/or the second lattice 12 may be composed of struts that are arranged along a centroid, edge, and/or vertex of a polyhedron of the mesh.

In some embodiments, the first lattice 11 and the second lattice 12 may be segments (e.g., a work cell) of the lattice structure 10. Methods for forming a lattice structure composed of a plurality of work cells of different lattice types are described, for example, in International Patent Application PCT/US2018/056842 to Kabaria et al. (claiming priority to U.S. Provisional Patent Application No. 62/579,346 to Kabaria and U.S. Provisional Patent Application No. 62/719,316 to Kabaria et al.), the contents of each of which is included by reference herein. In some embodiments, the lattice structure 10 may be a lattice formed, for example, using an additive manufacturing process. In some embodiments, the lattice structure 10 may be represented by a data representation of a lattice to be manufactured. Accordingly, the lattice structures described herein may refer both to a data representation of a physical lattice structure as well as the lattice constructed from such a data representation.

As illustrated in FIG. 1, the lattice structure 10 may further include a transition segment 14 connecting the first lattice 11 to the second lattice 12. The transition segment 14 may include a plurality of different unit cells, including the first lattice unit cell, the second lattice unit cell, and/or other lattice unit cells. In some embodiments, the transition segment 14 may include a repeating array of the first lattice unit cell interleaved with and/or interconnected to a repeating array of the second lattice unit cell. In some embodiments, a size of respective ones of the repeating array of the first lattice unit cell may progressively contract in size within the transition segment 14 as the distance from the first lattice 11 increases. Similarly, a size of respective ones of the repeating array of the second lattice unit cell may progressively contract in size within the transition segment 14 as the distance from the second lattice 12 increases. In some embodiments, the transition segment 14 may have a first portion connected to first lattice 11 and a second portion connected to the second lattice 12. The first lattice unit cells of the transition segment 14 may progressively contract in size from the first portion to the second portion and the second lattice unit cells of the transition segment 14 may progressively increase in size from the first portion to the second portion. The transition segment 14 may allow for a transition (e.g., a gradual and/or less abrupt transition) within the lattice structure 10 from the first lattice unit cell of the first lattice 11 to the second lattice unit cell of the second lattice 12.

In some embodiments, the transition segment 14 is formed by arranging unit cells of one type (e.g., the first lattice unit cells) at vertices and/or edges of cells of another type (e.g., the second lattice unit cells). For example, within the transition segment 14, the second lattice unit cells may be arranged at vertices and/or edges of ones of the first lattice unit cells, and further arranged such that a size of the second lattice unit cells is sequentially reduced as the arrangement proceeds from the second portion of the transition segment 14 to the first portion. In some embodiments, the size of the second lattice unit cells may be reduced until the second lattice unit cells are no longer present adjacent the first lattice unit cells (e.g., at a boundary of the first portion of the transition segment 14 and the first lattice 11. Similarly, within the transition segment 14, the first lattice unit cells may be arranged at vertices and/or edges of ones of the second lattice unit cells, and further arranged such that a size of the first lattice unit cells is sequentially reduced as the arrangement proceeds from the first portion of the transition segment 14 to the second portion. In some embodiments, the size of the first lattice unit cells may be reduced until the first lattice unit cells are no longer present adjacent the second lattice unit cells (e.g., at a boundary of the second portion of the transition segment 14 and the second lattice 12. In some embodiments, the increase in size of the first lattice unit cells from the first portion to the second portion and/or the increase in size of the second lattice unit cells from the second portion to the first portion may be progress as an expanding bubble within the transition segment 14.

Though FIG. 1 illustrates two lattice types (the first lattice 11 and the second lattice 12) it will be understood that additional lattices may be incorporated beyond only two. For example, a third lattice may connect to the first lattice 11 and/or the second lattice 12 via an additional transition segment. Additional lattices may include additional transition segments between the additional lattice and the lattice to which they connect. The additional transition segments may include unit cells from the two lattices between which the additional transition segments are located, in a manner as described herein with respect to the first lattice 11, the second lattice 12, and the transition segment 14.

Figure 2:
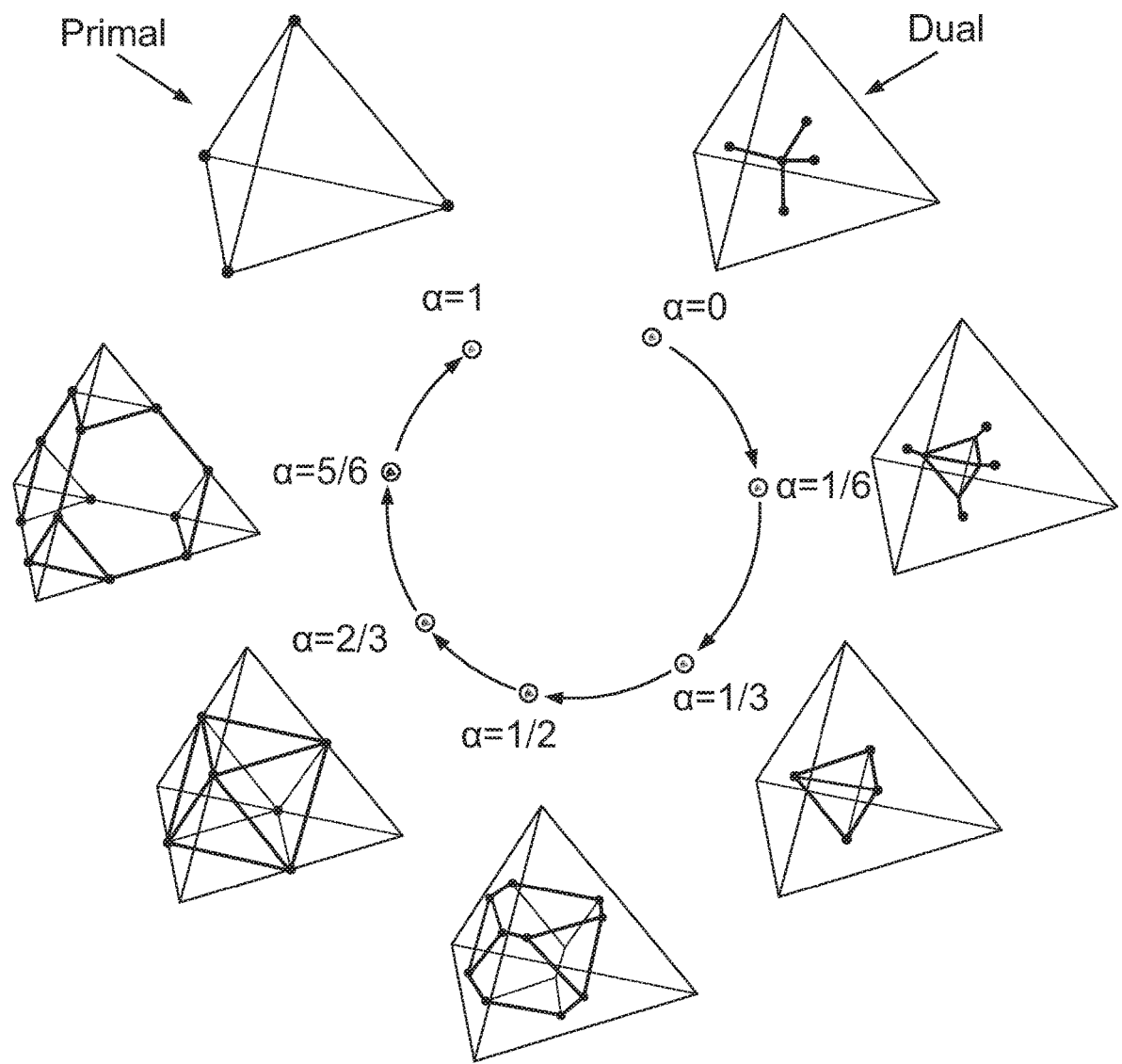
FIG. 2 schematically illustrates an example of the transition of a tetrahedral lattice unit cell to its dual, through a series of five intermediate lattice cells, as may be incorporated into the transition segment of a composite lattice structure of the present invention.

FIG. 2 is a non-limiting illustration of a variety of different lattice cell types that can be defined by a tetrahedral mesh unit cell, ranging from the primal unit cell (where struts are aligned with edges and connected at corners, and struts along edges are shared by adjacent cells) to the corresponding dual (where centroids of adjacent cells are connected to one another by struts. FIG. 2 illustrates a transition morphology of an inscribed polyhedral expansion. In FIG. 2, lines terminating as a point on each of the four faces of the tetrahedra represent struts projecting into, and connecting with the centroid of, adjacent tetrahedra. In all the embodiments shown, heavy lines represent struts of a cell; struts along edges are shared by adjacent cells; and struts ending on a face of the tetrahedra interconnect with corresponding struts of adjacent cells. A composite lattice structure of the present invention can be assembled from two or more separate lattices by producing an intermediate structure in which the cells progressively shift from one cell type to the other through the series of intermediate cell types, such as those illustrated in FIG. 2.

FIGS. 3-8 illustrate a servo-arm that can be produced in accordance with the invention. A primitive of the servo arm (FIGS. 3 and 4) is shown progressing through an intermediate (e.g., in a software program) (FIGS. 5 and 6) to a final form (FIGS. 7 and 8) of a lattice-filled servo arm, that can be produced by additive manufacturing. The final form may be generated, for example, in the form of a data file which may include a representation of the final lattice structure.

Figure 3:
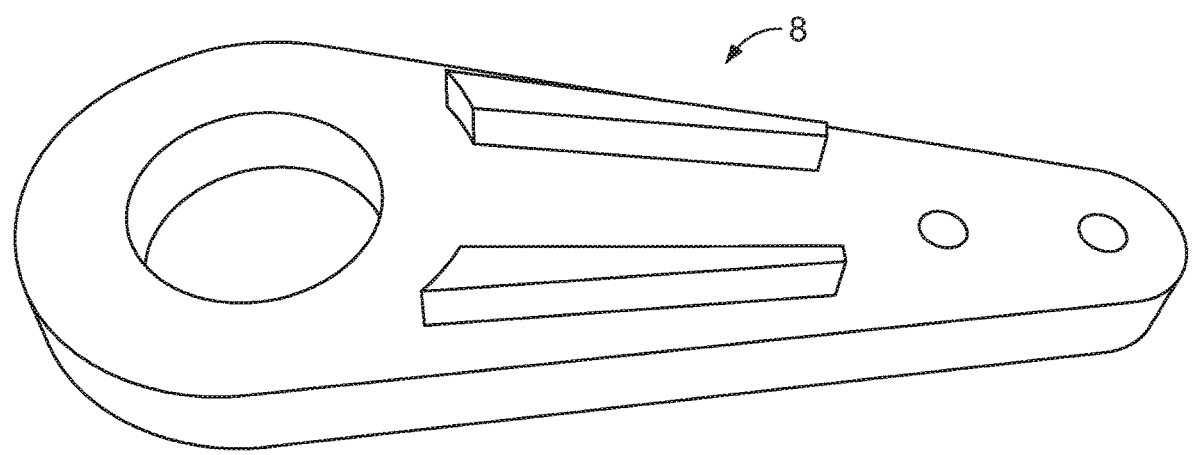
FIGS. 3 and 4 are perspective views of an example servo arm primitive, prior to being filled with lattices by a process of the present invention.
Figure 4:
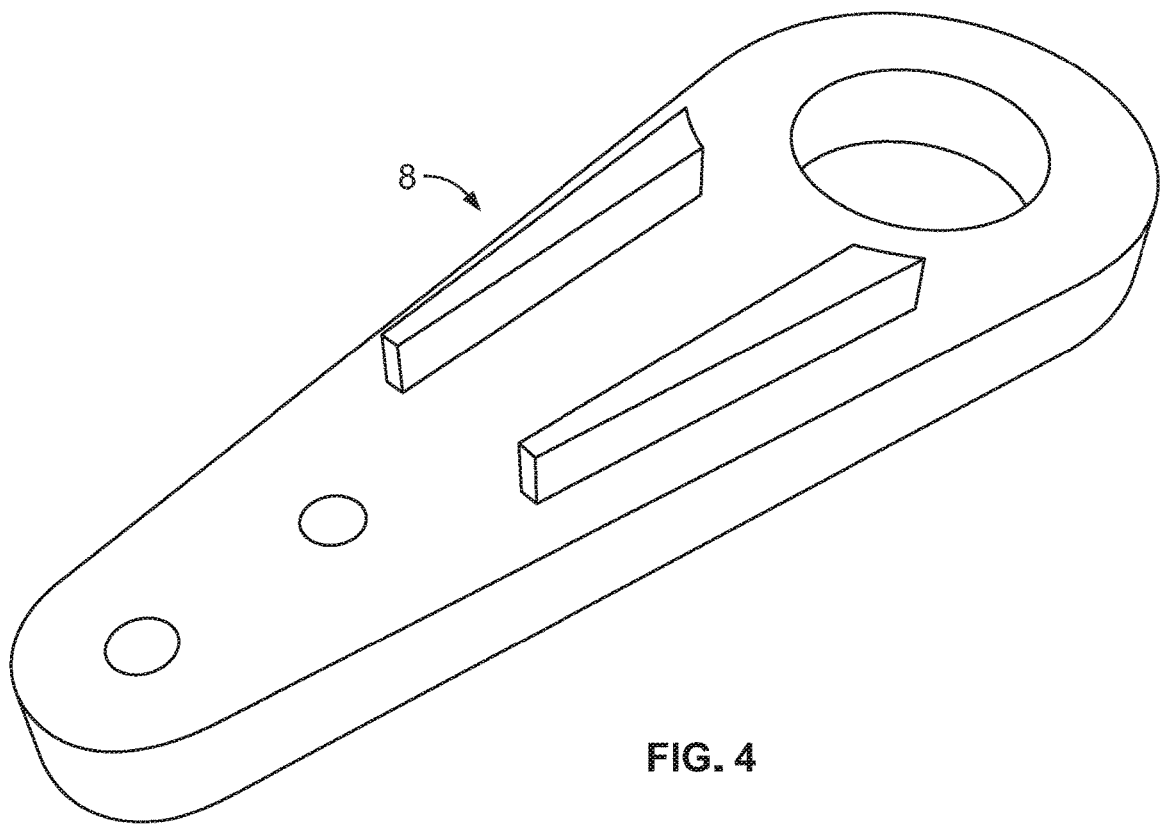

Referring to FIGS. 3 and 4, the primitive 8 of the servo arm may be generated. In some embodiments, the primitive 8 may be a data representation of a three-dimensional object. In some embodiments, the geometry of the data representation may include a polysurface file (e.g., an .iges file) or a boundary representation (BREP) file (e.g., a .stl, .obj, .ply, .3mf, .amf, or .mesh file). In some embodiments, the data representation may include a boundary shape such as, for example, an outer surface, of the three-dimensional object. In some embodiments, the data representation may include an outline and/or data description of the object in three-dimensions suitable for manufacturing via an additive manufacturing process.

Figure 5:
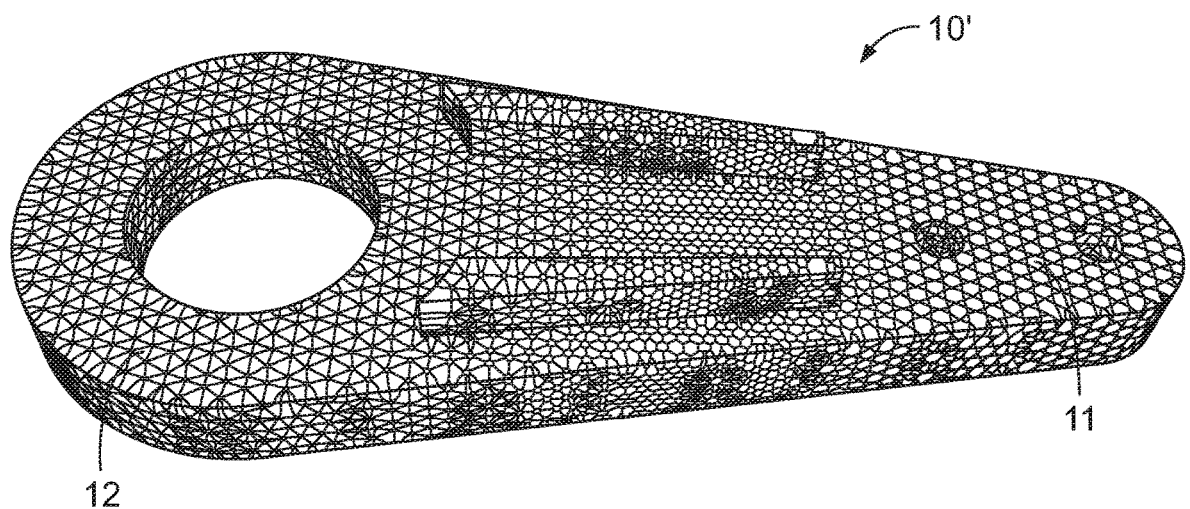
FIGS. 5 and 6 are perspective views of the example servo arm of FIGS. 3 and 4, partially converted to a lattice fill in a process of the present invention.
Figure 6:
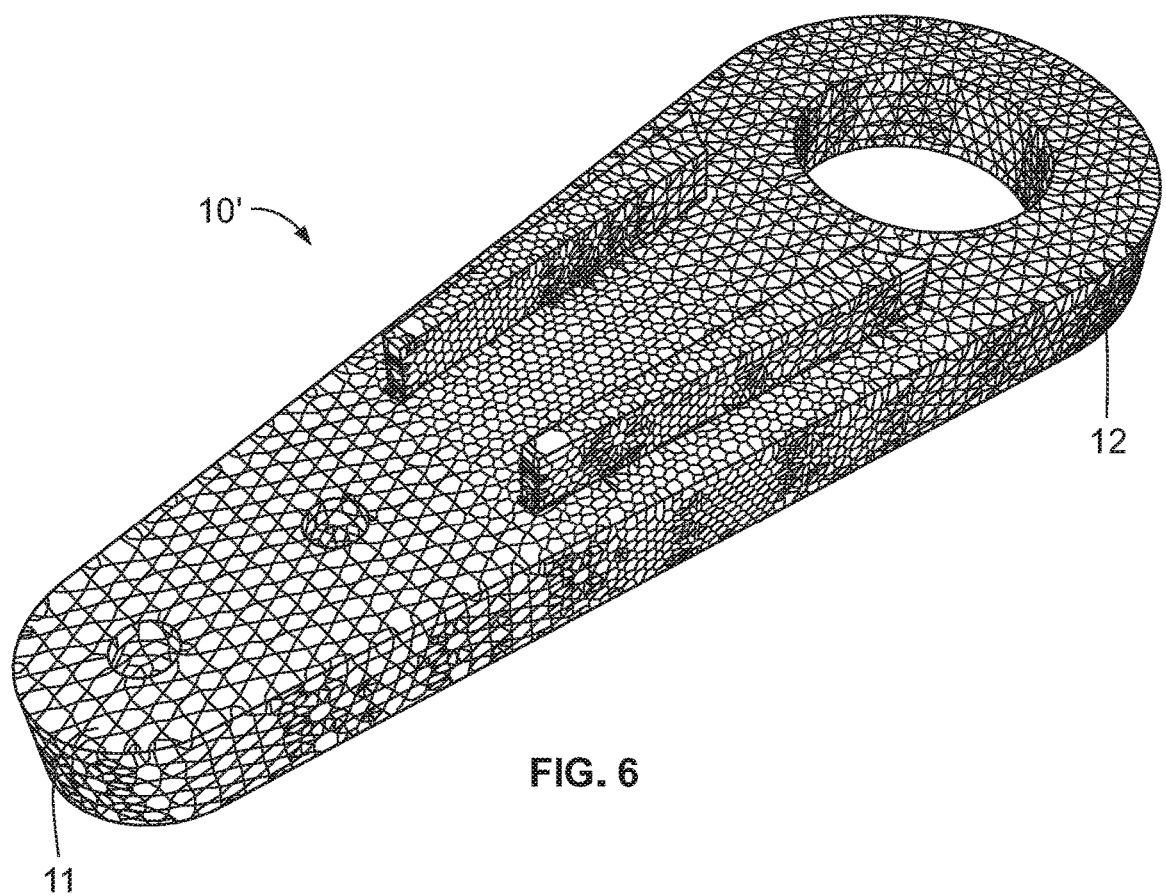

Referring to FIGS. 5 and 6, internal portions of the representation of the primitive may be replaced with an initial lattice structure 10'. The initial lattice structure 10' may include a representation of a first lattice 11 including first lattice unit cells and a second lattice 12 including second lattice unit cells, as well as a transition segment 14 between the first lattice 11 and the second lattice 12. The first lattice 11 and/or second lattice 12 may be selected based on a desired property (e.g., stability, flexibility, etc.) of the model of the primitive at particular physical locations. The transition segment 14 may be automatically generated based on the first lattice unit cells and the second lattice unit cells. In other words, the formulation of the transition segment 14 may be based on a repeating array of the first lattice unit cell interleaved with and/or interconnected to a repeating array of the second lattice unit cell. In some embodiments, a size of the first lattice unit cell and/or the second lattice unit cell may be adjusted to generate the transition segment 14. In some embodiments, the generation of the transition segment 14 may include interconnecting first lattice unit cells whose size diminishes in a direction away from the first lattice 11 with second lattice unit cells whose size diminishes in a direction away from the second lattice 12. Within the transition segment 14, there may be a first portion nearest the first lattice 11 and a second portion nearest the second lattice 12. Automatically generating the transition segment 14 may include arranging, within a data model, a plurality of first lattice unit cells with sizes that decrease from the first portion to the second portion, arranging, within the data model, a plurality of second lattice unit cells with sizes that decrease from the second portion to the first portion, and interconnecting the plurality of first lattice unit cells and the plurality of second lattice unit cells. In some embodiments, additional lattice unit cells of different types (e.g., different from the first lattice unit cell and/or second lattice unit cell) may be interspersed between the first lattice unit cells and the second lattice unit cells within the transition segment 14 so as to improve and/or maintain the stability of the transition segment 14.

Figure 7:
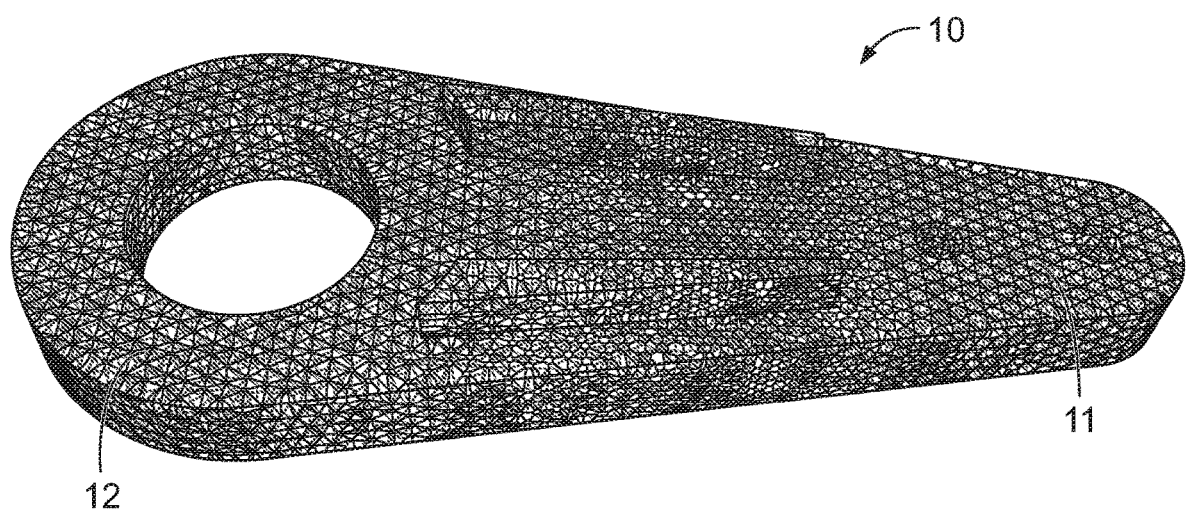
FIGS. 7 and 8 are perspective views of the example servo arm of FIGS. 3 and 4, fully converted to lattice fill by a process of the present invention.
Figure 8:
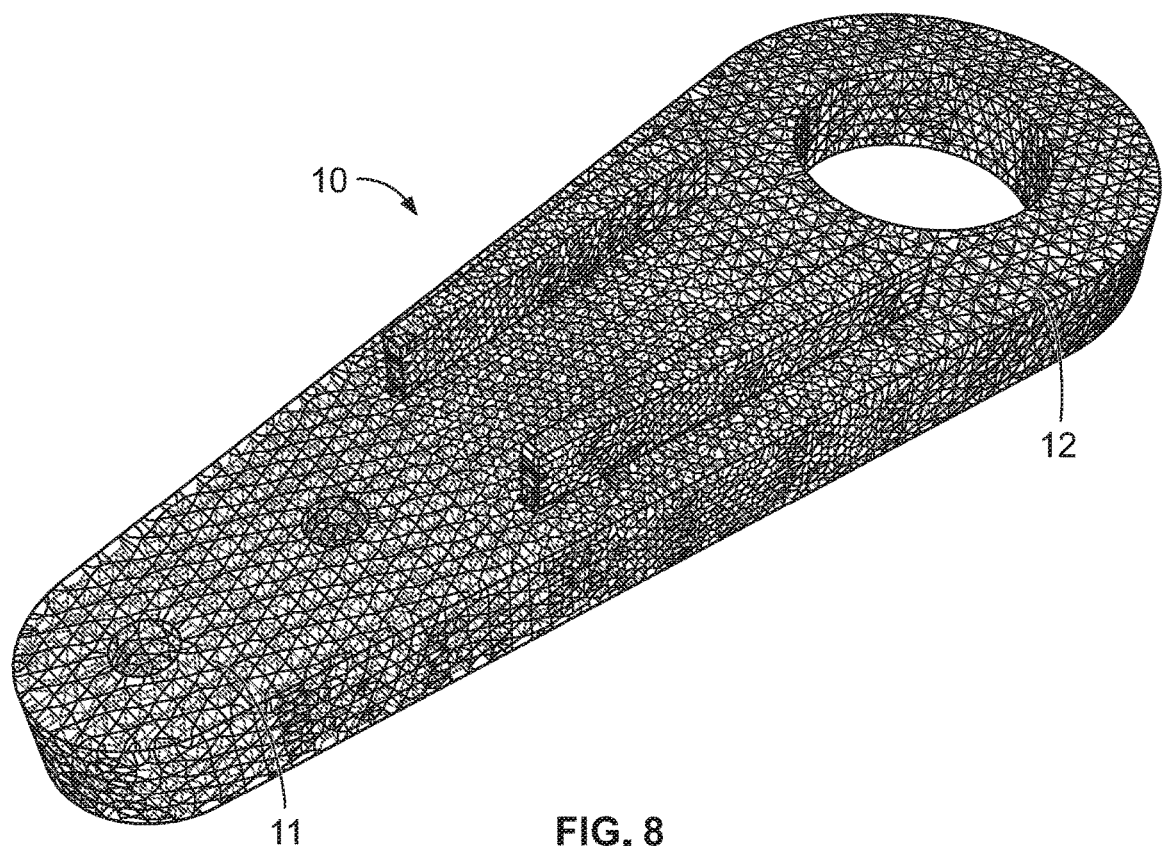

Referring to FIGS. 7 and 8, once the formulation of the initial lattice structure 10' is complete, a final lattice structure 10 may be generated. Formulation of the final lattice structure 10 may include the formation of struts along segments of the initial lattice structure 10', and the removal of internal portions of the mesh representation. The final lattice structure 10 may be represented in a data model suitable for three-dimensional modeling and/or printing via an additive manufacturing process (e.g., an .igs, .stl, .obj, .ply, .wrl, .x3d, .3mf, .amf, .fbx, or .mesh file).

It will be understood that during the generation of the initial lattice structure 10' and/or final lattice structure 10, portions of the lattice structure at and/or near edges of the lattice structure may be smoothed to create a planar and/or smooth surface. The smoothing may remove, for example, portions of the lattice structure that would otherwise extend outside of the boundary of the representation of the three-dimensional object. Smoothing may be accomplished according to known technologies understood by those of skill in the art. In some embodiments, an outer surface (e.g., a skin) having a particular thickness may be place on portions or all of lattice structure to provide an outer surface.

Figure 9:
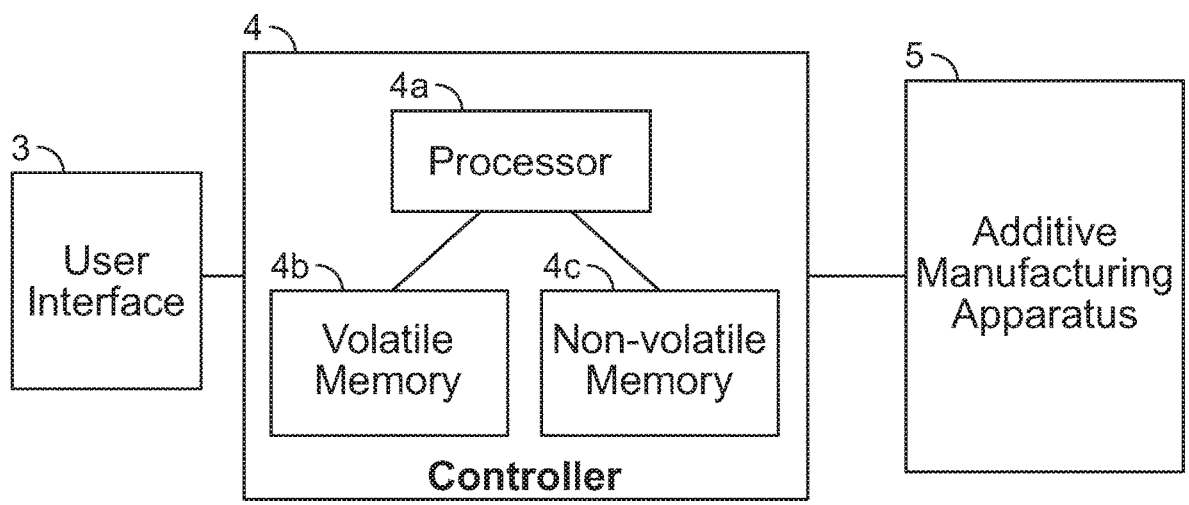
FIG. 9 schematically illustrates one embodiment of an apparatus useful for carrying out a method of the invention.

An apparatus for carrying out the present invention is schematically illustrated in FIG. 9. Such an apparatus includes a user interface 3 for inputting instructions (such as selection of an object to be produced, and selection of features to be added to the object), a controller 4, and a stereolithography apparatus 5 such as described above. An optional washer (not shown) can be included in the system if desired, or a separate washer can be utilized. Similarly, for dual cure resins, an oven (not shown) can be included in the system, although operated separate oven can also be utilized.

Connections between components of the system can be by any suitable configuration, including wired and/or wireless connections. The components may also communicate over one or more networks, including any conventional, public and/or private, real and/or virtual, wired and/or wireless network, including the Internet.

The controller 4 may be of any suitable type, such as a general-purpose computer. Typically the controller will include at least one processor 4a, a volatile (or "working") memory 4b, such as random-access memory, and at least one non-volatile or persistent memory 4c, such as a hard drive or a flash drive. The controller 4 may use hardware, software implemented with hardware, firmware, tangible computer-readable storage media having instructions stored thereon, and/or a combination thereof, and may be implemented in one or more computer systems or other processing systems. The controller 4 may also utilize a virtual instance of a computer. As such, the devices and methods described herein may be embodied in any combination of hardware and software that may all generally be referred to herein as a "circuit," "module," "component," and/or "system." Furthermore, aspects of the present invention may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one processor 4a of the controller 4 may be configured to execute computer program code for carrying out operations for aspects of the present invention, which computer program code may be written in any combination of one or more programming languages, including an object oriented programming language such as Java, Scala, Smalltalk, Eiffel, JADE, Emerald, C++, C4, VB.NET, or the like, conventional procedural programming languages, such as the "C" programming language, Visual Basic, Fortran 2003, COBOL 2002, PHP, ABAP, dynamic programming languages such as Python, PERL, Ruby, and Groovy, or other programming languages.

The at least one processor 4a may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks.

Connections between internal components of the controller 4 are shown only in part and connections between internal components of the controller 4 and external components are not shown for clarity, but are provided by additional components known in the art, such as busses, input/output boards, communication adapters, network adapters, etc. The connections between the internal components of the controller 4, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Advanced Technology Attachment (ATA) bus, a Serial ATA (SATA) bus, and/or an Institute of Electrical and Electronics Engineers (IEEE) standard 1394 bus, also called "Firewire."

The user interface 3 may be of any suitable type. The user interface 3 may include a display and/or one or more user input devices. The display may be accessible to the at least one processor 4a via the connections between the system components. The display may provide graphical user interfaces for receiving input, displaying intermediate operation/data, and/or exporting output of the methods described herein. The display may include, but is not limited to, a monitor, a touch screen device, etc., including combinations thereof. The input device may include, but is not limited to, a mouse, keyboard, camera, etc., including combinations thereof. The input device may be accessible to the at least one processor 4a via the connections between the system components. The user interface 3 may interface with and/or be operated by computer readable software code instructions resident in the volatile memory 4b that are executed by the processor 4a.

According to some embodiments described herein, an additively manufactured lattice structure includes (a) a first three-dimensional lattice including a repeating interconnected array of a first lattice unit cell, (b) a second three-dimensional lattice including a repeating interconnected array of a second lattice unit cell, wherein said second lattice unit cell is different from said first lattice unit cell, and (c) a first transition segment interconnecting said first three-dimensional lattice and said second three-dimensional lattice. The first transition segment includes (i) a first three-dimensional transitional lattice including a repeating array of said first lattice unit cell and (ii) interleaved with and interconnected to said first three-dimensional transitional lattice, a second three-dimensional transitional lattice including a repeating array of said second lattice unit cell.

In some embodiments, the lattice structure father includes (d) a third three-dimensional lattice comprising of a repeating interconnected array of a third lattice unit cell, wherein said third lattice unit cell is different from said second, and optionally said first, lattice unit cell and (e) a second transition segment interconnecting said second three-dimensional lattice and said third three-dimensional lattice. The second transition segment includes (iii) a third three-dimensional transitional lattice comprising a repeating array of said second lattice unit cell, and (iv) interleaved with and interconnected to said third three-dimensional transitional lattice, a fourth three-dimensional transitional lattice comprising a repeating array of said third lattice unit cell.

In some embodiments, said first transition segment has a first portion connected to said first three-dimensional lattice and a second portion connected to said second three-dimensional lattice, said first lattice unit cells of said first three-dimensional transitional lattice progressively contract in size from said first portion to said second portion, said second lattice unit cells of said second three-dimensional transitional lattice progressively expand in size from said first portion to said second portion, said second transition segment when present has a third portion connected to said second three-dimensional lattice and a fourth portion connected to said third three-dimensional lattice when present, said second lattice unit cells of said third three-dimensional transitional lattice progressively contract in size from said third portion to said fourth portion, and said third lattice unit cells of said fourth three-dimensional transitional lattice progressively expand in size from said first portion to said second portion.

In some embodiments, the lattice structure is produced by a process of additive manufacturing (e.g., selective laser sintering (SLS), fused deposition modeling (FDM), stereolithography (SLA), three-dimensional printing (3DP), or multijet modeling (MJM).

In some embodiments, said first three-dimensional lattice and second three-dimensional lattice are formed form the same material (e.g., a polymer, metal, ceramic, or composite thereof).

In some embodiments, said lattice structure is rigid, flexible, or elastic.

In some embodiments, said first and second lattice arrays are independently selected tetrahedral mesh (e.g., an A15, C15, or alpha space packing, etc.) or hexahedral mesh lattices.

According to some embodiments described herein, a brace, arm, link, shock absorber, cushion, or pad includes a lattice structure of the embodiments described herein.

According to some embodiments described herein, a wearable protective device includes a brace, arm, link, shock absorber, cushion, or pad of the embodiments described herein (e.g., a shin guard, knee pad, elbow pad, sports brassiere, bicycling shorts, backpack strap, backpack back, neck brace, chest protector, protective vest, protective jackets, slacks, suits, overalls, jumpsuit, and protective slacks, etc.).

According to some embodiments described herein, a bed or seat includes a brace, arm, link, shock absorber, cushion, or pad of the embodiments described herein.

According to some embodiments described herein, automotive or aerospace panel, bumper, or component includes a brace, arm, link, shock absorber, cushion, or pad of the embodiments described herein.

According to some embodiments described herein, a method of making an object of the embodiments described herein includes (a) providing a digital model of said object; and then (b) producing said object from said digital model by an additive manufacturing process.

According to some embodiments described herein, a method for generating a lattice structure includes generating a first three-dimensional lattice comprising a first repeating interconnected array of a first lattice unit cell, generating a second three-dimensional lattice comprising a first repeating interconnected array of a second lattice unit cell, wherein the second lattice unit cell is different from the first lattice unit cell, and generating a transition segment interconnecting the first three-dimensional lattice and the second three-dimensional lattice, wherein the transition segment comprises a first three-dimensional transitional lattice comprising a second repeating array of the first lattice unit cell, and, interleaved with and interconnected to the first three-dimensional transitional lattice, a second three-dimensional transitional lattice comprising a second repeating array of the second lattice unit cell.

In some embodiments, the transition segment has a first portion connected to the first three-dimensional lattice and a second portion connected to the second three-dimensional lattice, the first lattice unit cells of the first three-dimensional transitional lattice progressively contract in size from the first portion to the second portion, and the second lattice unit cells of the second three-dimensional transitional lattice progressively expand in size from the first portion to the second portion.

In some embodiments, generating the transition segment interconnecting the first three-dimensional lattice and the second three-dimensional lattice comprises placing ones of the second repeating array of the second lattice unit cell adjacent a vertex and/or edge of ones of the second repeating array of the first lattice unit cell.

In some embodiments, the transition segment further comprises a third three-dimensional transitional lattice comprising a repeating array of a third lattice unit cell, different from the first lattice unit cell and the second lattice unit cell.

According to some embodiments described herein, a computer program product includes a tangible non-transitory computer readable storage medium comprising computer readable program code embodied in the computer readable storage medium that when executed by at least one processor causes the at least one processor to perform operations including generating a first three-dimensional lattice comprising a first repeating interconnected array of a first lattice unit cell, generating a second three-dimensional lattice comprising a first repeating interconnected array of a second lattice unit cell, wherein the second lattice unit cell is different from the first lattice unit cell, and generating a transition segment interconnecting the first three-dimensional lattice and the second three-dimensional lattice, wherein the transition segment comprises a first three-dimensional transitional lattice comprising a second repeating array of the first lattice unit cell, and, interleaved with and interconnected to the first three-dimensional transitional lattice, a second three-dimensional transitional lattice comprising a second repeating array of the second lattice unit cell.

The foregoing is illustrative of the present invention, and is not to be construed as limiting thereof. The invention is defined by the following claims, with equivalents of the claims to be included therein.

We claim:

1. An additively manufactured lattice structure, comprising:
   (a) a first three-dimensional lattice comprising a repeating interconnected array of a first lattice unit cell;
   (b) a second three-dimensional lattice comprising a repeating interconnected array of a second lattice unit cell, wherein said second lattice unit cell is different from said first lattice unit cell;
   (c) a first transition segment interconnecting said first three-dimensional lattice and said second three-dimensional lattice; said first transition segment comprising:
      (i) a first three-dimensional transitional lattice comprising a repeating array of said first lattice unit cell; and
      (ii) interleaved with and interconnected to said first three-dimensional transitional lattice, a second three-dimensional transitional lattice comprising a repeating array of said second lattice unit cell,
   wherein:
   said first transition segment has a first portion connected to said first three-dimensional lattice and a second portion connected to said second three-dimensional lattice;
   said first lattice unit cells of said first three-dimensional transitional lattice progressively contract in size from said first portion to said second portion; and
   said second lattice unit cells of said second three-dimensional transitional lattice progressively expand in size from said first portion to said second portion.

2. The lattice structure of claim 1, further comprising:
   (d) a third three-dimensional lattice comprising of a repeating interconnected array of a third lattice unit cell, wherein said third lattice unit cell is different from said second, and optionally said first, lattice unit cell; and
   (e) a second transition segment interconnecting said second three-dimensional lattice and said third three-dimensional lattice; said second transition segment comprising:
      (iii) a third three-dimensional transitional lattice comprising a repeating array of said second lattice unit cell; and
      (iv) interleaved with and interconnected to said third three-dimensional transitional lattice, a fourth three-dimensional transitional lattice comprising a repeating array of said third lattice unit cell.

3. The lattice structure of claim 2, wherein:
said second transition segment has a third portion connected to said second three-dimensional lattice and a fourth portion connected to said third three-dimensional lattice when present;
said second lattice unit cells of said third three-dimensional transitional lattice progressively contract in size from said third portion to said fourth portion; and
said third lattice unit cells of said fourth three-dimensional transitional lattice progressively expand in size from said first portion to said second portion.

4. The lattice structure of claim 1 produced by a process of additive manufacturing (e.g., selective laser sintering (SLS), fused deposition modeling (FDM), stereolithography (SLA), three-dimensional printing (3DP), or multijet modeling (MJM).

5. The lattice structure of claim 1, wherein said first three-dimensional lattice and second three-dimensional lattice are formed from the same material.

6. The lattice structure of claim 1, wherein said lattice structure is rigid, flexible, or elastic.

7. The lattice structure of claim 1, wherein said first and second lattice unit cell arrays are independently selected tetrahedral mesh or hexahedral mesh lattices.

8. A brace, arm, link, shock absorber, cushion, or pad comprised of a lattice structure of claim 1.

9. A wearable protective device comprising a brace, arm, link, shock absorber, cushion, or pad of claim 8.

10. A bed or seat comprising a brace, arm, link, shock absorber, cushion, or pad of claim 8.

11. An automotive or aerospace panel, bumper, or component comprising a brace, arm, link, shock absorber, cushion, or pad of claim 8.

12. A method of making an object of claim 1, comprising:
(a) providing a digital model of said object; and then
(b) producing said object from said digital model by an additive manufacturing process.

13. A method for generating a lattice structure, comprising:
generating a first three-dimensional lattice comprising a first repeating interconnected array of a first lattice unit cell;
generating a second three-dimensional lattice comprising a first repeating interconnected array of a second lattice unit cell, wherein the second lattice unit cell is different from the first lattice unit cell; and
generating a transition segment interconnecting the first three-dimensional lattice and the second three-dimensional lattice, wherein the transition segment comprises a first three-dimensional transitional lattice comprising a second repeating array of the first lattice unit cell, and, interleaved with and interconnected to the first three-dimensional transitional lattice, a second three-dimensional transitional lattice comprising a second repeating array of the second lattice unit cell,
wherein:
the transition segment has a first portion connected to the first three-dimensional lattice and a second portion connected to the second three-dimensional lattice;
the first lattice unit cells of the first three-dimensional transitional lattice progressively contract in size from the first portion to the second portion; and
the second lattice unit cells of the second three-dimensional transitional lattice progressively expand in size from the first portion to the second portion.

14. The method of claim 13, wherein generating the transition segment interconnecting the first three-dimensional lattice and the second three-dimensional lattice comprises placing ones of the second repeating array of the second lattice unit cell adjacent a vertex and/or edge of ones of the second repeating array of the first lattice unit cell.

15. The method of any claim 13, wherein the transition segment further comprises a third three-dimensional transitional lattice comprising a repeating array of a third lattice unit cell, different from the first lattice unit cell and the second lattice unit cell.

16. A computer program product comprising:
a tangible non-transitory computer readable storage medium comprising computer readable program code embodied in the computer readable storage medium that when executed by at least one processor causes the at least one processor to perform operations comprising:
generating a first three-dimensional lattice comprising a first repeating interconnected array of a first lattice unit cell;
generating a second three-dimensional lattice comprising a first repeating interconnected array of a second lattice unit cell, wherein the second lattice unit cell is different from the first lattice unit cell; and
generating a transition segment interconnecting the first three-dimensional lattice and the second three-dimensional lattice, wherein the transition segment comprises a first three-dimensional transitional lattice comprising a second repeating array of the first lattice unit cell, and, interleaved with and interconnected to the first three-dimensional transitional lattice, a second three-dimensional transitional lattice comprising a second repeating array of the second lattice unit cell,
wherein:
the transition segment has a first portion connected to the first three-dimensional lattice and a second portion connected to the second three-dimensional lattice;
the first lattice unit cells of the first three-dimensional transitional lattice progressively contract in size from the first portion to the second portion; and
the second lattice unit cells of the second three-dimensional transitional lattice progressively expand in size from the first portion to the second portion.

17. The computer program product of claim 16, wherein generating the transition segment interconnecting the first three-dimensional lattice and the second three-dimensional lattice comprises placing ones of the second repeating array of the second lattice unit cell adjacent a vertex and/or edge of ones of the second repeating array of the first lattice unit cell.

18. The computer program product of claim 16, wherein the transition segment further comprises a third three-dimensional transitional lattice comprising a repeating array of a third lattice unit cell, different from the first lattice unit cell and the second lattice unit cell.

* * * * *